(12) United States Patent
Rohner et al.

(10) Patent No.: US 11,790,529 B2
(45) Date of Patent: Oct. 17, 2023

(54) METHOD FOR FABRICATING A DENTAL RESTORATION

(71) Applicant: Ivoclar Vivadent AG, Schaan (LI)

(72) Inventors: Gottfried Rohner, Altstätten (CH); Hendrik John, Buchs (CH); Rudolf Jussel, Feldkirch-Gisingen (AT); Christian Niedrig, Rüthi (CH)

(73) Assignee: Ivoclar Vivadent AG, Schaan (LI)

( * ) Notice: Subject to any disclaimer, the term of this patent is extended or adjusted under 35 U.S.C. 154(b) by 0 days.

(21) Appl. No.: 17/475,399

(22) Filed: Sep. 15, 2021

(65) Prior Publication Data

US 2022/0110727 A1 Apr. 14, 2022
US 2023/0245313 A9 Aug. 3, 2023

(30) Foreign Application Priority Data

Oct. 13, 2020 (EP) .................................. 20201553
Dec. 21, 2020 (EP) .................................. 20215936
(Continued)

(51) Int. Cl.
*G06T 7/00* (2017.01)
*G06T 7/33* (2017.01)
(Continued)

(52) U.S. Cl.
CPC ............ *G06T 7/0014* (2013.01); *A61C 9/004* (2013.01); *A61C 9/0053* (2013.01);
(Continued)

(58) Field of Classification Search
CPC ... A61C 9/004; A61C 9/0053; A61C 13/0004; A61C 13/0019; A61C 13/082;
(Continued)

(56) References Cited

U.S. PATENT DOCUMENTS 6,726,476 B2 * 4/2004 Jung ..................... G01J 3/0218
433/29
9,008,417 B2 * 4/2015 Rohner ..................... G01J 3/02
382/165

(Continued)

*Primary Examiner* — Nicholas D Lucchesi
(74) *Attorney, Agent, or Firm* — Ann M. Knab; Thad McMurray

(57) ABSTRACT

The present invention relates to a method for fabricating a dental restoration, comprising the steps of rendering (S101) a first digital tooth model with a first material combination for generating a first actual data set representing the optical properties of the first digital tooth model; determining (S102) a first deviation between a target data set and the first actual data set; rendering (S103) a second digital tooth model based on a second combination of materials to generate a second actual data set representing the optical properties of the second digital tooth model; determining (S104) a second deviation between the target data set and the second actual data set; and fabricating (S105) the dental restoration based on the first digital tooth model when the first deviation is less than the second deviation and fabricating the dental restoration based on the second digital tooth model when the second deviation is less than the first deviation.

15 Claims, 4 Drawing Sheets

(30) Foreign Application Priority Data

Dec. 21, 2020 (EP) .................................... 20215943
Dec. 21, 2020 (EP) .................................... 20215945

(51) Int. Cl.

| | | |
|---|---|---|
| *G06T 3/40* | (2006.01) | |
| *G06T 5/00* | (2006.01) | |
| *A61C 13/00* | (2006.01) | |
| *A61C 19/10* | (2006.01) | |
| *G06T 15/08* | (2011.01) | |
| *B33Y 50/00* | (2015.01) | |
| *B33Y 80/00* | (2015.01) | |
| *B29C 64/386* | (2017.01) | |
| *G06F 30/10* | (2020.01) | |
| *A61C 9/00* | (2006.01) | |
| *A61C 13/34* | (2006.01) | |
| *A61C 13/08* | (2006.01) | |
| *A61C 13/09* | (2006.01) | |
| *G06T 15/00* | (2011.01) | |
| *B29L 31/00* | (2006.01) | |
| *G01J 3/50* | (2006.01) | |

(52) U.S. Cl.
CPC ...... *A61C 13/0004* (2013.01); *A61C 13/0019* (2013.01); *A61C 13/082* (2013.01); *A61C 13/09* (2013.01); *A61C 13/34* (2013.01); *A61C 19/10* (2013.01); *B29C 64/386* (2017.08); *B33Y 50/00* (2014.12); *B33Y 80/00* (2014.12); *G06F 30/10* (2020.01); *G06T 3/40* (2013.01); *G06T 5/002* (2013.01); *G06T 7/0012* (2013.01); *G06T 7/344* (2017.01); *G06T 15/00* (2013.01); *G06T 15/08* (2013.01); *B29L 2031/7532* (2013.01); *G01J 3/508* (2013.01); *G06T 2207/10024* (2013.01); *G06T 2207/30036* (2013.01); *G06T 2210/41* (2013.01)

(58) Field of Classification Search
CPC ......... A61C 13/09; A61C 13/34; A61C 19/10; G06T 7/0014; G06T 7/344; B33Y 50/00; B33Y 80/00; B29C 64/386; G06F 30/10
See application file for complete search history.

(56) References Cited

U.S. PATENT DOCUMENTS

| | | | |
|---|---|---|---|
| 9,662,188 B2 | 5/2017 | Laubersheimer et al. | |
| 2016/0008112 A1* | 1/2016 | Reischle | A61C 5/77 |
| | | | 264/16 |
| 2019/0029784 A1 | 1/2019 | Moalem et al. | |
| 2019/0125493 A1* | 5/2019 | Salah | G16H 30/40 |
| 2022/0110725 A1* | 4/2022 | John | G06T 15/08 |

* cited by examiner

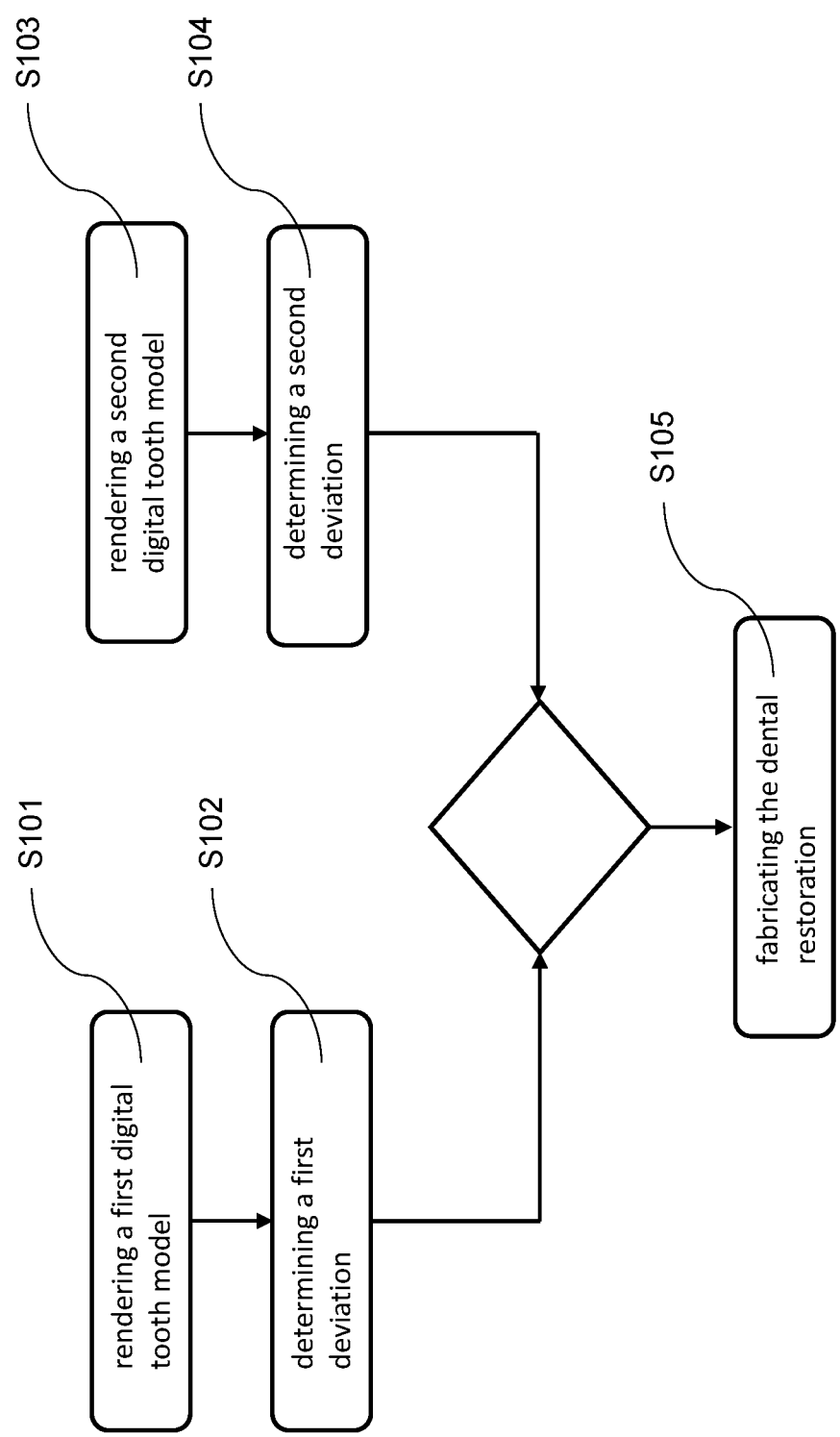

METHOD FOR FABRICATING A DENTAL RESTORATION

CROSS-REFERENCE TO RELATED APPLICATIONS

This application claims priority to European patent application European Patent Application No. 20215943.0, filed on Dec. 21, 2020 and European Patent Application No. 20201553.3 filed on Oct. 13, 2020, European Patent Application No. 20215945.5, filed on Dec. 21, 2020, European Patent Application No. 20215936.4, filed on Dec. 21, 2020, the disclosures of which are incorporated herein by reference in their entirety.

TECHNICAL FIELD

The present invention relates to a method for fabricating a dental restoration, a computer device for fabricating a dental restoration, and a computer program.

BACKGROUND

Dental restorations can be constructed from a variety of different materials in order to reproduce the appearance of a natural tooth as faithfully as possible. However, the selection of the appropriate materials is complex and can lead to suboptimal results. It is often unclear how the optical properties of the dental restoration are achieved by the respective restoration materials. Therefore, it is difficult to fabricate a new dental restoration with the desired optical properties.

EP 2 486 892 B1 and corresponding U.S. Pat No. 9,662,188B2, which US patent is hereby incorporated by reference, describe how a virtual tooth's appearance on a calibrated screen is compared with the image of the neighboring tooth by a user to gain a realistic impression. If the result is not yet satisfactory, the layer thickness or translucency can be adjusted, for example. However, inaccuracies always occur when a user visually compares the results on the screen.

SUMMARY

It is the technical object of the present invention to determine a material combination for a dental restoration such that it corresponds to a desired natural appearance.

This technical object is solved by objects according to the independent claims. Technically advantageous embodiments are the subject of the dependent claims, the description, and the drawings.

According to a first aspect, the technical problem is solved by a method for fabricating a dental restoration, comprising the steps of rendering a first digital tooth model with a first material combination for generating a first actual data set representing the optical properties of the first digital tooth model; determining a first deviation between a target data set and the first actual data set; rendering a second digital dental model with a second combination of materials to generate a second actual data set representing the optical properties of the second digital dental model; determining a second deviation between the target data set and the second actual data set; and fabricating the dental restoration based on the first digital dental model when the first deviation is less than the second deviation and fabricating the dental restoration based on the second digital dental model when the second deviation is less than the first deviation.

By varying the assignment of different restoration materials to an inner architecture of the tooth model, the method can be used to calculate in advance the appearance of the dental restoration to be produced. The optimum result can be determined from a large number of combinations by comparing the optical appearances of the respective actual data sets with the specified target data set. The target data set may have been previously determined based on an adjacent tooth. In this way, a material combination and allocation for the fabrication of the dental restoration can be determined. The outer shape and inner architecture of the dental restoration can be specified.

In a technically advantageous embodiment of the method, the first digital tooth model and the second digital tooth model reproduce the same spatial geometry. This has the technical advantage, for example, that the procedure can be performed with a higher degree of accuracy.

In a further technically advantageous embodiment of the method, the rendering of the first digital tooth model is performed by means of a first processor and the rendering of the second digital tooth model is performed by means of a second processor. This has the technical advantage, for example, that the rendering steps can be performed simultaneously and the method can be carried out more quickly.

In a further technically advantageous embodiment of the method, the rendering of the first digital tooth model is performed in parallel with the rendering of the second digital tooth model. This also has the technical advantage, for example, that the rendering steps can be performed simultaneously and the method can be carried out more quickly.

In a further technically advantageous embodiment of the method, the first and/or second deviation is calculated on the basis of a Euclidean distance between the target data set and the actual data set or on the basis of a spectral distance between the target data set and the actual data set. This also has, for example, the technical advantage that the deviation can be calculated with a high degree of accuracy.

In a further technically advantageous embodiment of the method, the first and/or the second material combination comprises at least two different restoration materials. This also has, for example, the technical advantage that a dental restoration with as natural an appearance as possible is obtained.

In a further technically advantageous embodiment of the method, the spatial structure of the first and/or second digital tooth model is predetermined. This has the technical advantage, for example, that the structure of the digital tooth models remains constant and material combinations are varied only, which shortens the calculation time of the method.

In a further technically advantageous embodiment of the method, the rendering is performed based on color values, reflection values, transmission values and/or absorption values of the respective restoration materials. This has the technical advantage, for example, that a highly accurate rendering is performed which faithfully reproduces the subsequent appearance of the dental restoration.

In a further technically advantageous embodiment of the method, the optical properties of a cement layer, composite layer, adhesive layer and/or the color impression of the preparation are additionally taken into account during rendering. This has, for example, the technical advantage that a more lifelike appearance is achieved during rendering and both materials for the subsequent cementation of the dental restoration and the preparation are taken into account.

In a further technically advantageous embodiment of the method, a specific number of restoration materials is predetermined and the method is repeated for all possible material combinations. Each rendering step can be performed in parallel. This has, for example, the technical advantage that the dental restoration can be adapted as precisely as possible.

In a further technically advantageous embodiment of the method, the material combination selected for fabrication is the one with the smallest deviation between the target data set and the respective actual data set. This has the technical advantage, for example, that the optimum result is achieved for given restoration materials.

In a further technically advantageous embodiment of the method, the digital tooth model has a predetermined outer shape and a predetermined inner structure. This has, for example, the technical advantage of improving the calculation basis.

In a further technically advantageous embodiment of the method, the target data set is obtained based on a natural tooth. This has, for example, the technical advantage that the dental restoration can be adapted to a natural tooth.

In a further technically advantageous embodiment of the method, the target data set reproduces the optical properties and/or the geometry of the natural tooth. This has the technical advantage, for example, of further improving the fidelity of the dental restoration.

According to a second aspect, the technical problem is solved by a computer device for fabricating a dental restoration, comprising a fabricating device suitable for carrying out the method according to the first aspect. Thereby, the same technical advantages are achieved as by the method according to the first aspect. The computer device may include a computing unit with at least one algorithm that is configured to perform the method herein.

According to a third aspect, the technical problem is solved by a computer program comprising instructions that cause the computer device according to the second aspect to perform the method steps according to the first aspect. Thereby, the same technical advantages are achieved as by the method according to the first aspect. The computer program product may include program code which is stored on a non-transitory machine-readable medium, the machine-readable medium including computer instructions executable by a processor, which computer instructions cause the processor to perform the method herein.

BRIEF DESCRIPTION OF THE DRAWINGS

Examples of embodiments of the invention are shown in the drawings and are described in more detail below wherein the figures show the following:

FIG. 4 a block diagram of a method for producing a dental restoration.

DETAILED DESCRIPTION

Figure 1:
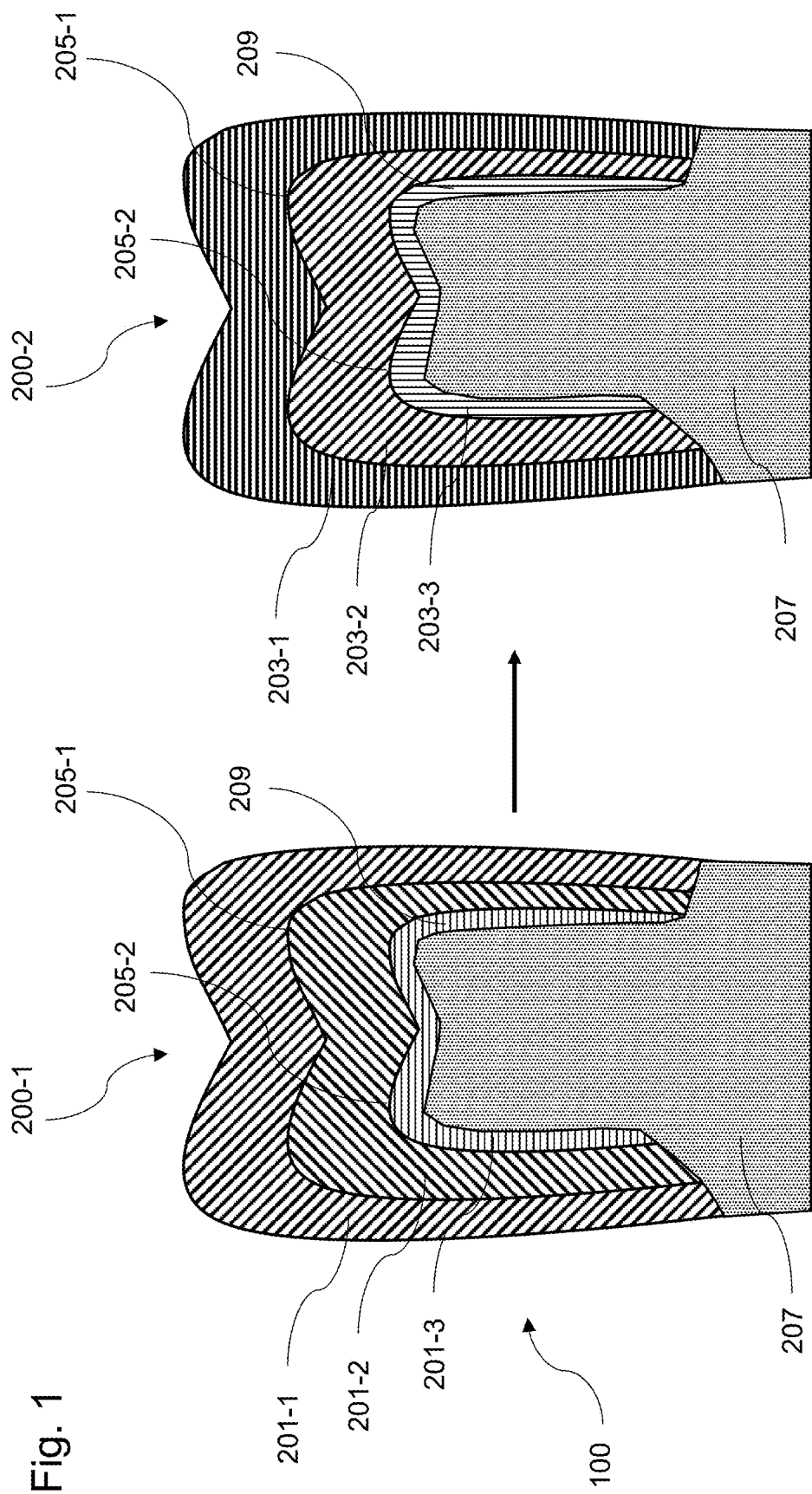
FIG. 1 a schematic representation of digital tooth models.

FIG. 1 shows a schematic representation of digital tooth models 200-1 and 200-2 for a dental restoration 100. The outer shape and the inner spatial structure of the subsequent dental restoration 100 are specified by the digital tooth models 200-1 and 200-2. The outer shape can be generated in a CAD program for this purpose. The inner spatial structure can be calculated or taken from databases, for example derived from the structure of a natural tooth or calculated from the outer shape of the dental restoration 100 or a natural tooth. Given a predetermined outer shape of the dental restoration 100, an inner layered structure can be defined by the tooth models 200-1 and 200-2, and each individual layer can be assigned its own restoration material 201 and 203 with predetermined optical material parameters. The appearance of the same residual tooth 207, or the same preparation of the tooth to be treated, is assumed for the tooth models.

For example, the first dental model 200-1 reproduces a dental restoration 100 that is built up in layers from the different restoration materials 201-1, 201-2 and 201-3. In an outer layer, the restoration material 201-1 is used, in a middle layer, the restoration material 201-2 is used, and in an inner layer, the restoration material 201-3 is used. The inner layer may also be an adhesive layer 209.

The second tooth model 200-2 reproduces the same dental restoration 100, which is also constructed in layers from different restoration materials 203-1, 203-2 and 203-3. However, an outer layer uses restoration material 203-1, a middle layer uses restoration material 203-2, and an inner layer uses restoration material 203-3. The inner layer may also be an adhesive layer 209 with an adhesive material 203-3. Therefore, the material combination of the first tooth model 200-1 is different from the material combination of the second tooth model 200-2.

The optical and physical properties of the respective assigned restoration materials 201-1, . . . , 201-3, 203-1, . . . , and 203-3 are known, such as color values, scattering values, reflectance values, transmittance values, and/or absorption values.

By means of a rendering (light simulation process) using ray tracing, the color and translucency of the dental restoration can be calculated based on the previously created tooth models 200. In this way, the subsequent appearance and optical impression of the biomimetic dental restoration can be calculated from the dental models 200, such as a bridge, crown, partial crown, inlay, onlay or veneer.

Rendering is performed using a physically correct simulation of the interaction of light and the planned dental restoration 100 and the restoration materials used. The known optical parameters of the individual restoration materials are used to generate a computer-aided view of the dental restoration 100.

For this purpose, existing natural tooth material can also be taken into account, such as a residual tooth on which the dental restoration 100 is to be placed. During rendering, the optical impression of the subsequent dental restoration 100 is calculated for the specified internal structure and the selected restoration materials. For rendering, a computer-aided calculation of reflection, transmission and absorption values in the visible range at at least three wavelengths can be performed.

For the fabricating method, a target data set is first determined. The target data set can be obtained by optically capturing and evaluating an adjacent tooth. For this purpose, an electronic camera or a 3D scanner can be used to determine the color values, reflection, transmission and/or absorption values and the spatial shape or an image of the natural tooth. Based on this data, the dental restoration 100 is planned with as identical properties as possible and a spatial tooth model 200 is planned.

The target dataset is used to compare the rendered appearance of the dental restoration 100 under variation of restoration materials assigned to the inner architecture until an optimal approximation to the target dataset is found.

Ideally, for the comparison, the rendering of the dental restoration 100 is performed from the same viewing angle or perspective from which the target data set was obtained based on the natural tooth. Rendering can also be performed from different viewing angles to improve the results. Rendering can be performed for any viewing angle and any selectable environmental situations, such as a predetermined lighting situation, taking into account adjacent teeth, a position of the dental restoration 100 in the oral cavity, or a shape and optical properties of the residual tooth to be prepared. Other influencing conditions can also be considered during rendering, such as known optical data of an adhesive layer 209 (cement, composite and/or adhesive).

Rendering the digital tooth models 200-1 and 200-2 thus produces an actual data set that reproduces the optical properties of the digital tooth models 200-1 and 200-2.

Figure 2:
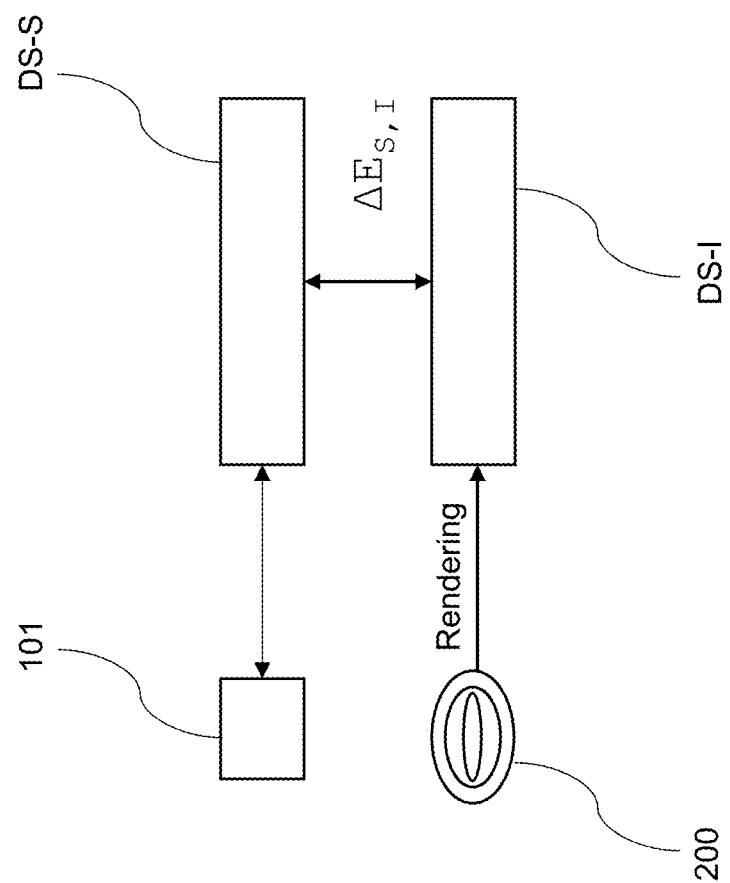
FIG. 2 a representation of a comparison between a target data set and an actual data set.

FIG. 2 shows a schematic representation of a deviation $\Delta E_{S,I}$ between the target data set DS-S and the actual data set DS-I (DS-I-1, DS-I-2). The target data set DS-S is obtained, for example, by an electronic camera 101.

The digitally generated dental model 200 includes data about the spatial geometry of the dental restoration 100 and the associated restoration materials from which the dental restoration 100 is to be made and the areas in which the restoration materials are to be arranged. The optical and physical properties of the restoration materials required for rendering are known in the rendering software. These can be taken from a parameter table which is constantly supplemented with new materials.

The actual data set DS-I is obtained by rendering the digital tooth model 200 with a selected material combination. During rendering, the spatial geometry of the dental restoration 100 and the optical and physical properties of the various restoration materials encountered, including adhesive material and residual tooth or preparation if applicable, are taken into account.

The propagation of light in the tooth model 200 can be described by Maxwell's equations. For example, the rendering uses the Radiative Transport Equation (RTE), in which a propagation medium is described by the absorption coefficient, the scattering coefficient, the refractive index and the scattering phase function.

The digital tooth model 200 includes data on the spatial geometry of the dental restoration 100 and the internal architecture, as well as the absorption coefficient, scattering coefficient, refractive index, and scattering phase function for the respective restoration materials 201 and 203 of the architecture. The scattering phase function, when rendered based on the tooth model 200 with the aforementioned parameters, can be numerically solved to any desired accuracy in a Monte Carlo simulation in which a plurality of photons propagate through the tooth model 200 along random paths.

From this, an actual data set DS-I for the appearance of the dental restoration 100 can be calculated by rendering, which considers the materials used, the external shape and the internal architecture of the tooth model 200. This calculated actual data set DS-I can then be compared to the target data set DS-S, which has been obtained based on an adjacent tooth. To simplify the comparison, this can be performed in a two-dimensional derivation (two-dimensional image). In general, however, three-dimensional methods can also be used. A numerical value is calculated as a measure for a deviation $\Delta E_{S,I}$ between the actual data set DS-I and the target data set DS-S.

Figure 3:
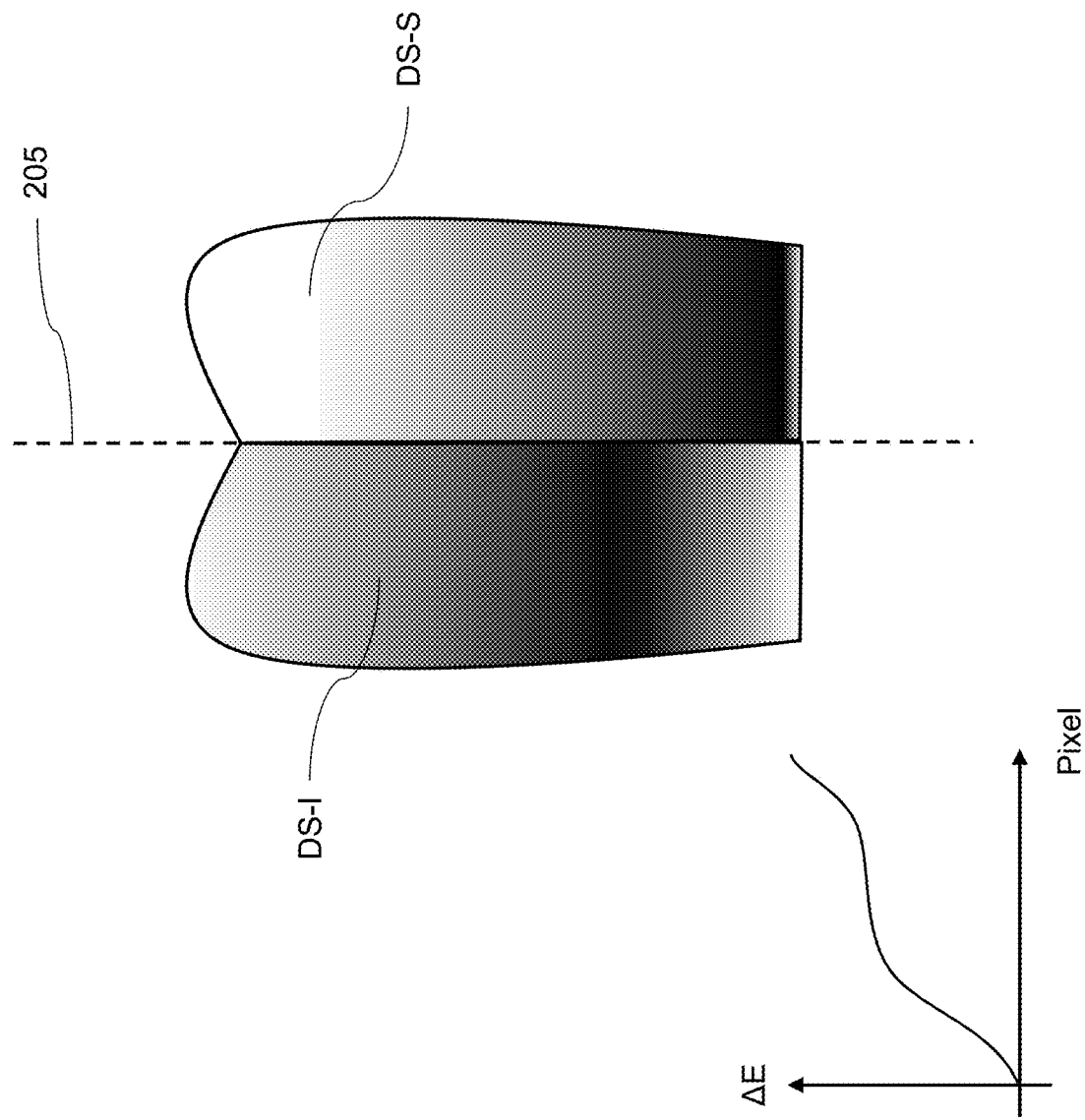
FIG. 3 a schematic representation for calculating a deviation between a target data set and an actual data set.

FIG. 3 shows a schematic representation for calculating a deviation $\Delta E_{S,I}$ between the target data set DS-S and an actual data set DS-I. For example, the data set DS-S comprises a representation of the tooth in a given perspective. In contrast, the data set DS-I, which has been rendered from the tooth model 200, comprises a representation of the tooth model 200 in the same perspective. The two images from the target data set DS-S and the actual data set DS-I are scaled to the same size and placed next to each other.

The Euclidean deviation $\Delta E_{S,I}$ ($\Delta E1_{S,I}$, $\Delta E2_{S,I}$) between the target data set DS-S and the actual data set DS-I can be calculated by summing up the differences in the color values of the pixels along the comparison lines 205, for example in the L*a*b* color space. These comparison lines 205 can be moved arbitrarily, for example by moving the halves of the teeth together. In general, however, the comparison line 205 can also have a different course. The comparison can be made at pixel level as the smallest resolution.

$$\Delta E_{S,I} = \sqrt{(L_S^* - L_I^*)^2 + (a_S^* - a_I^*)^2 + (b_S^* - b_I^*)^2}$$

The greater the difference in the color gradient along the comparison line 205, the greater the numerical deviation $\Delta E_{S,I}$. If there is a perfect color match between the target data set DS-S and the actual data set DS-I, the deviation $\Delta E_{S,I}$ is zero. In general, however, other methods can be used to calculate the deviation $\Delta E_{S,I}$, such as based on spectral information.

FIG. 4 shows a block diagram of the method for fabricating the dental restoration 100. In first step S101, the first digital tooth model 200-1 is rendered with a first material combination to generate a first actual data set DS-I-1 representing the optical properties of the first digital tooth model 200-1. In step S102, this first actual data set DS-I-1 is compared to the target data set DS-S to obtain a first deviation $\Delta E1_{S,I}$ between the target data set DS-S and the first actual data set DS-I-1.

In step S103, the second digital tooth model 200-2 is then rendered with a second material combination to generate a second actual data set DS-I-2 representing the optical properties of the second digital tooth model 200-2. In step S104, this second actual data set DS-I-2 is also compared with the target data set DS-S to obtain a second deviation $\Delta E2_{S,I}$ between the target data set DS-S and the second actual data set DS-I-1.

In step S105, the dental restoration 100 is then fabricated based on the first digital tooth model 200-1 if the first deviation $\Delta E1_{S,I}$ is less than the second deviation $\Delta E2_{S,I}$ and or fabricated based on the second digital tooth model 200-1 if the second deviation $\Delta E2_{S,I}$ is less than the first deviation $\Delta E1_{S,I}$.

The method can be used to render all possible material combinations of the geometrically given overall system. If all possible material combinations are calculated, it is possible, for example, to determine the best combination which comes closest to the DS-S target data set and which can optimally imitate the natural appearance of the tooth. An objective target/actual comparison is obtained by the procedure and an optimum assignment of restoration materials to the respective spatial areas of the dental restoration 100 is achieved by computer support (best match).

If the internal structure of tooth models 200-1 and 200-2 remains the same, a change in the selected material combination is calculated for individual layers. The best combination is then determined.

The rendering of the digital tooth models 200-1 and 200-2 can be performed in parallel or simultaneously on different processors so that optimum results are obtained in a short time. The parallel rendering of different possible variations of the material assignment solves the problem of quickly finding an optically patient-specific suitable dental restoration 100. An iterative calculation is not necessary in this case.

A parallel calculation and simulation of all possible material combinations for a tooth model 200 with a given external shape and internal architecture and a subsequent comparison of the obtained actual data sets with the target data set can be used to determine a best possible material combination.

In addition, it is possible in the method to calculate tooth models 200-1 and 200-2 with virtual restoration materials to which predetermined optical properties have been assigned beforehand. A suitable combination of materials can also be determined from this. Subsequently, the dental restoration 100 can be produced with real restoration materials whose properties approximate the virtual restoration materials 201 and 203. In this way, too, the desired overall impression of the restoration 100 can be achieved.

The method can be used to determine an optimal selection and allocation of restoration materials 201 and 203 for creating the multilayer restoration 100 prior to fabrication of the restoration 100, while ensuring optimal esthetics of the restoration 100. By rendering with the physical and optical parameters of existing restoration materials, a dental restoration 100 can subsequently be fabricated with an optimal combination of materials.

Once the combination of materials has been determined, the dental restoration 100 can be fabricated using a 3D printing process or other suitable process with the respective restoration materials. In this case, a computer device can be used to perform the calculation steps and then fabricate the dental restoration 100 using the fabrication device. For this purpose, the computer device executes a computer program comprising instructions that cause the computer device to execute the required process steps. The computer device includes a processor and a digital memory that stores the data sets and a computer program that executes the procedural steps and suitably controls a fabrication device. The fabricating device is, for example, a 3D printer that prints the dental restoration 100 with the various restoration materials. However, in general, other fabricating devices can be used that can fabricate the dental restoration with the different restoration materials.

All features explained and shown in connection with individual embodiments of the invention may be provided in different combinations in the subject-matter of the invention to simultaneously realize their beneficial effects.

All method steps can be implemented by devices which are suitable for executing the respective method step. All functions that are executed by objective features can be a method step of a method.

In some embodiments, the innovations may be implemented in diverse general-purpose or special-purpose computing systems. For example, the computing environment can be any of a variety of computing devices (e.g., desktop computer, laptop computer, server computer, tablet computer, gaming system, mobile device, programmable automation controller, etc.) that can be incorporated into a computing system comprising one or more computing devices.

In some embodiments, the computing environment includes one or more processing units and memory. The processing unit(s) execute computer-executable instructions. A processing unit can be a central processing unit (CPU), a processor in an application-specific integrated circuit (ASIC), or any other type of processor. In a multi-processing system, multiple processing units execute computer-executable instructions to increase processing power. A tangible memory may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage, one or more input devices, one or more output devices, and one or more communication connections. An interconnection mechanism such as a bus, controller, or network, interconnects the components of the computing environment. Typically, operating system software provides an operating environment for other software executing in the computing environment, and coordinates activities of the components of the computing environment.

The tangible storage may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage stores instructions for the software implementing one or more innovations described herein.

Where used herein, the term "non-transitory" is a limitation on the computer-readable storage medium itself—that is, it is tangible and not a signal—as opposed to a limitation on the persistence of data storage. A non-transitory computer-readable storage medium does not necessarily store information permanently. Random access memory (which may be volatile, non-volatile, dynamic, static, etc.), read-only memory, flash memory, memory caches, or any other tangible, computer-readable storage medium, whether synchronous or asynchronous, embodies it.

The input device(s) may be, for example: a touch input device, such as a keyboard, mouse, pen, or trackball; a voice input device; a scanning device; any of various sensors; another device that provides input to the computing environment; or combinations thereof. The output device may be a display, printer, speaker, CD-writer, or another device that provides output from the computing environment.

The scope of protection of the present invention is given by the claims and is not limited by the features explained in the description or shown in the figures.

REFERENCE LIST 100 dental restoration
101 electronic camera
200 tooth model
201 restoration material
203 restoration material
205 comparison line
207 residual tooth
209 fixing layer
DS-I actual dataset
DS-S target data set

The invention claimed is:

1. A method for fabricating a dental restoration (100), comprising the steps:
   rendering (S101) a first digital tooth model (200-1) with a first combination of materials to generate a first actual data set (DS-I-1) representing the optical properties of the first digital tooth model (200-1);

determining (S102) a first deviation ($\Delta E1_{S,I}$) between a target data set (DS-S) and the first actual data set (DS-I-1);

rendering (S103) a second digital tooth model (200-2) with a second material combination to generate a second actual data set (DS-I-2) representing the optical properties of the second digital tooth model (200-2);

determining (S104) a second deviation ($\Delta E2_{S,I}$) between the target data set (DS-S) and the second actual data set (DS-I-2); and fabricating (S105) the dental restoration (100) based on the first digital tooth model (200-1) if the first deviation ($\Delta E1_{S,I}$) is smaller than the second deviation ($\Delta E2_{S,I}$) and fabricating the dental restoration (100) based on the second digital tooth model (200-2) if the second deviation ($\Delta E2_{S,I}$) is smaller than the first deviation ($\Delta E1_{S,I}$).

2. The method according to claim 1, wherein the first digital tooth model (200-1) and the second digital tooth model (200-1) represent the same spatial geometry.

3. The method according to claim 1, wherein the rendering (S101) of the first digital tooth model (200-1) with the first combination of materials is performed by means of a first processor and the rendering (S103) of the second digital tooth model (200-2) with the second material combination is performed by means of a second processor.

4. The method according to claim 1, wherein the first and/or second deviation ($\Delta E1_{S,I}$, $\Delta E2_{S,I}$) is calculated on the basis of a Euclidean distance between the target data set (DS-S) and the first actual data set (DS-I) or on the basis of a spectral distance between the target data set (DS-S) and the first actual data set (DS-I).

5. The method according to claim 1, wherein the first and/or the second material combination comprises at least two different restoration materials.

6. The method according to claim 1, wherein a spatial structure of the first and/or the second digital tooth model (200-1, 200-2) is predetermined.

7. The method according to claim 5, wherein each rendering (S101, S103) is carried out based on color values, reflectance values, transmittance values and/or absorbance values of the different restoration materials.

8. The method according to claim 1, wherein each rendering (S101, S103) additionally takes into account the optical properties of a cement layer, composite layer, adhesive layer and/or the color impression of the preparation during rendering.

9. The method according to claim 1, wherein a specific number of materials is predetermined and the method is repeated for all possible material combinations.

10. The method according to claim 9, wherein a material combination selected for fabricating is the one which has the smallest deviation between the target data set (DS-S) and the respective actual data set.

11. The method according to claim 1, wherein each digital tooth model has a predetermined outer shape and a predetermined inner structure.

12. The method according to claim 1, wherein the target data set (DS-S) is obtained on the basis of a natural tooth.

13. The method according to claim 12, wherein the target data set (DS-S) represents the optical properties and/or the geometry of the natural tooth.

14. A computer device for fabricating a dental restoration (100), comprising a fabricating apparatus and a computing unit with at least one algorithm that is configured to perform the method of claim 1.

15. A computer program product comprising program code which is stored on a non-transitory machine-readable medium, the machine-readable medium comprising computer instructions executable by a processor, which computer instructions cause the processor to perform the method according to claim 1.

* * * * *